(No Model.)
P. NERNEY.
SPECTACLE EYE GUARD OR SHIELD.
No. 604,238. Patented May 17, 1898.
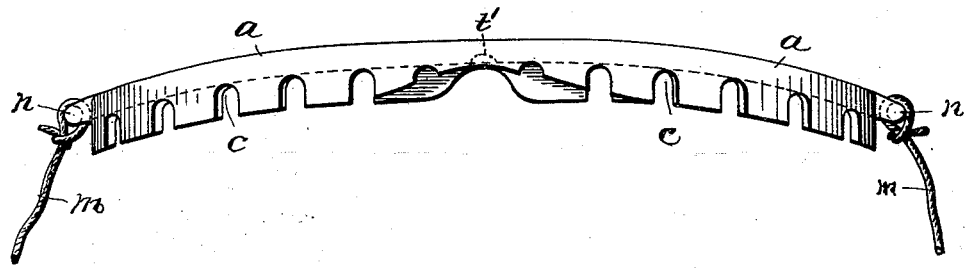
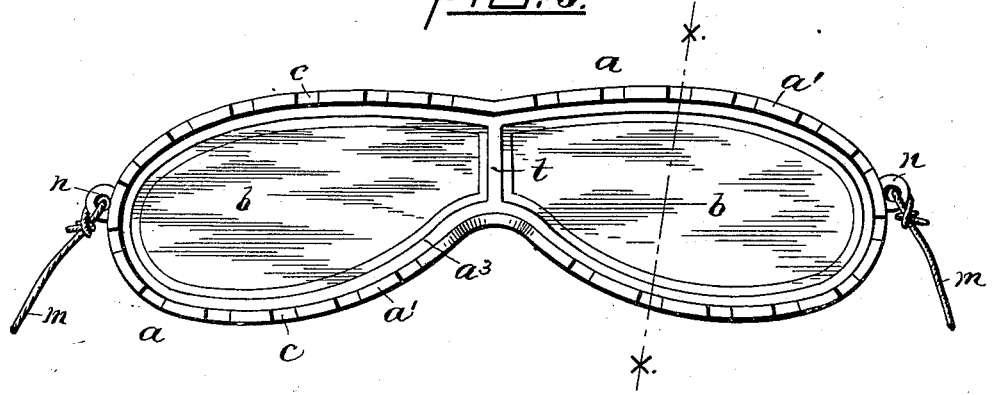
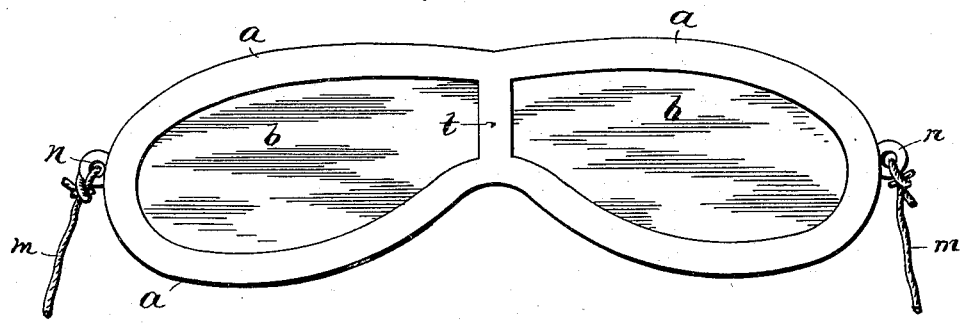
WITNESSES.
INVENTOR.
Peter Nerney.
by Geo. H. Remington
Atty.

United States Patent Office.

PETER NERNEY, OF ATTLEBOROUGH, MASSACHUSETTS.

SPECTACLE EYE GUARD OR SHIELD.

SPECIFICATION forming part of Letters Patent No. 604,238, dated May 17, 1898.

Application filed September 15, 1897. Serial No. 651,766. (No model.)

*To all whom it may concern:*

Be it known that I, PETER NERNEY, a citizen of the United States, residing at Attleborough, in the county of Bristol and State of Massachusetts, have invented certain new and useful Improvements in Spectacle Eye Guards or Shields; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to a new and improved spectacle eye guard or shield; and it consists, essentially, of a one-piece frame or rim, made of vulcanized rubber, having shields or lenses of mica or other suitable transparent material mounted therein, as hereinafter set forth and claimed.

In spectacles or devices of the class forming the subject of my present invention it has been usual heretofore, so far as I am aware, to employ a composite frame for holding the lenses in position—that is to say, such former frames were composed of a thin sheet-metal base, a binding of flexible material, as cloth, cemented to the base, the lenses being interposed between them, and a circumscribing cushion, of felt, cemented or otherwise secured to the base and binding. As thus constructed eye-guards are more liable to become unserviceable, owing to the fact that moisture or perspiration readily decomposes or softens the cement or glue employed for securing the lenses in position in the frame. Moreover, the cost of such former devices was increased by reason of the number of parts entering into the construction of the lens-frames, as well as in the use of materials varying widely in character.

The object I have in view is to produce an improved eye-guard in which the cost of labor and materials employed in its construction are reduced to a minimum, the device at the same time being stronger and less liable to get out of order and also possessing greater flexibility or adaptability to conform to the face of the wearer.

In the accompanying sheet of drawings, Figure 1 is a top view of my improved eye-guard. Fig. 2 is a front elevation of the same. Fig. 3 is a view showing the opposite or rear side of the device, and Fig. 4 is a transverse section taken on line $x$ $x$ of Fig. 3.

I would state that in order to more clearly represent the eye-guard the drawings show the device in a somewhat exaggerated form.

The entire frame or lens-holding portion $a$ of my improved eye-guard is or may be composed of vulcanized rubber. The outline or contour of the frame may have any desired or suitable shape. I prefer, however, to make it substantially as represented, wherein the two lens-holding portions are separated longitudinally by a central transverse tie $t$, the latter being integral with and uniting the upper and lower sides of the frame or rim $a$.

The back side of the frame—that is, the side contiguous to the face of the wearer—is provided with a suitably-shaped narrow flange $a'$, extending at substantially right angles to the plane of the frame. The said flange follows the contour of the frame and forms a comparatively soft cushion adapted when in use to bear against and conform to that portion of the face and forehead surrounding the eyes, thus protecting them from dust, snow, rain, &c. The flange may be provided with openings $c$ at intervals, thereby ventilating the eye-guard.

At the base of the flange the frame is provided with a groove or recess $a^2$, the upper side of which terminates in the projecting edge portion $a^3$, adapted to bear snugly against the surface of the lens. (See Fig. 4.)

The lenses $b$ may be made of mica or other suitable transparent material. I prefer to use mica because it is somewhat flexible. The two eyepieces or lenses $b$ are introduced into and seated in the said grooves $a^2$ of the frame, the material of the latter being sufficiently yielding or elastic to permit it, yet at the same time adapted to prevent the lens from being accidentally detached or dismounted.

In order to hold the device in position when in use, the frame may be provided with small end ears $n$, having the ends of a cord or elastic connection $m$ secured thereto.

In my improved eye-guard the frame or rim member $a$, together with the said flange $a'$ and the lens-holding device, are all made integral, thereby reducing the cost of manufacture, as well as reducing the liability of accident to a minimum. Moreover, by means of the herein-described manner of construction the frame may, if desired, be folded along the center of the tie member $t$, thereby forming the functions of a joint without the use of a hinge or other analogous device. If desired, the said tie portion may be reduced in thickness, (see dotted line $t'$, Fig. 1,) thus rendering the frame more readily foldable. In lieu of making the frame $a$ of rubber other suitable material or substance that can be properly molded or shaped may be employed—as, for example, celluloid, leatherette, &c.

I claim as my invention and desire to secure by United States Letters Patent—

As a new article of manufacture, an eye guard or shield consisting of a non-absorbent flexible frame formed in a single integral structure having two lens portions separated by a central integral transverse tie, and provided with an integral horizontal flange having ventilating-openings, and flexible lenses held in the lens portions.

In testimony whereof I have affixed my signature in presence of two witnesses.

PETER NERNEY.

Witnesses:
GEO. H. REMINGTON,
REMINGTON SHERMAN.